No. 655,916. Patented Aug. 14, 1900.
W. TORST, Jr.
SYSTEM FOR INDIVIDUAL SERVICE ON ELECTRICAL PARTY LINES.
(Application filed Sept. 25, 1899.)
(No Model.) 2 Sheets—Sheet 2.
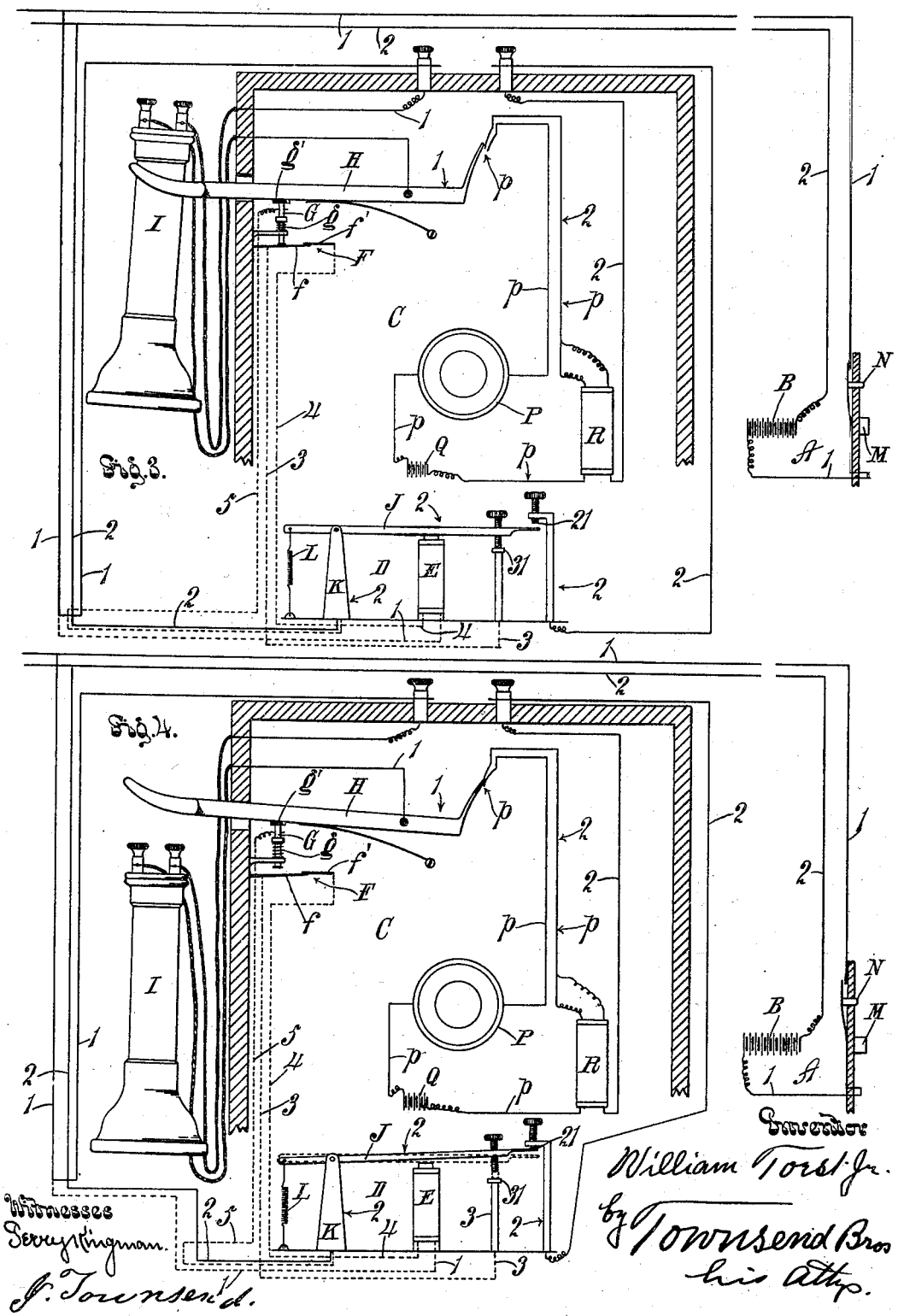

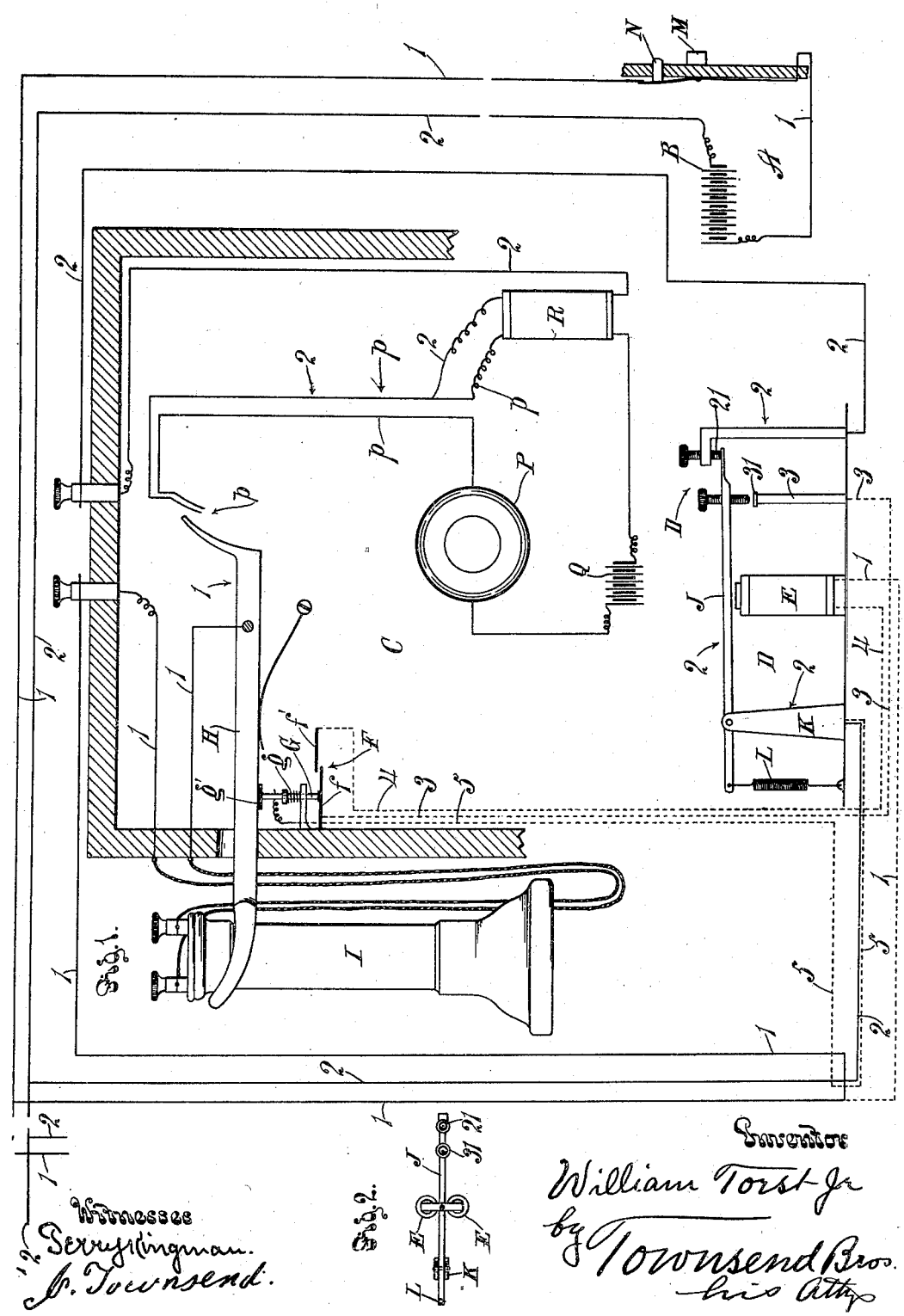

UNITED STATES PATENT OFFICE.

WILLIAM TORST, JR., OF LOS ANGELES, CALIFORNIA, ASSIGNOR OF ONE-HALF TO WILLIAM P. MOONEY, OF SAN PEDRO, CALIFORNIA.

SYSTEM FOR INDIVIDUAL SERVICE ON ELECTRICAL PARTY-LINES.

SPECIFICATION forming part of Letters Patent No. 655,916, dated August 14, 1900.

Application filed September 25, 1899. Serial No. 731,672. (No model.)

*To all whom it may concern:*

Be it known that I, WILLIAM TORST, Jr., a citizen of the United States, residing at Los Angeles, in the county of Los Angeles and State of California, have invented a new and useful System for Individual Service on Electrical Party-Lines, of which the following is a specification.

My invention is applicable for use with telephones or any other form of electrical service-machines connected with a common metallic circuit.

One object of my invention is to provide means whereby a number of telephones on a metallic circuit can be given individual service, so that conversation may be carried on through any one of the telephones of the line without any one at any of the other telephones being able to hear the same.

My invention includes, in a party-line system, the combination, with a central station, a service-machine, and an electrical circuit connecting the two, of a cut-out on the service-circuit, means connected with the service-machine for energizing the magnet of a cut-out by a current from the service-circuit when the service-machine is thrown into operative condition, and independent means for opening and closing the service-circuit, so that the act of placing the service-machine in operative condition causes the cut-out to cut off the current from the machine, and the operator at the central office can release the cut-out by cutting off the current, and thus demagnetize the magnet of the cut-out, and thereby allow the cut-out to return to position to close the circuit through the service-machine.

My system for individual service on electrical party-lines also particularly comprises the combination, with the central station and the telephone or other service-machine connected therewith by a metallic circuit, of an electrical cut-out on said circuit, a magnet for operating the cut-out, a metallic circuit connecting the magnet with the service-circuit, a switch in the connecting-circuit between the magnet and the service-line, a supplemental conductor connected with one line of the service-circuit, a key connected with the supplemental conductor and arranged to open and close the switch and to electrically connect the supplemental conductor with the magnet-wire at the instants only of respectively opening and closing the switch, and independent means for opening and closing the service-circuit.

The accompanying drawings illustrate my invention.

Figure 1 is a fragmental view of a telephone party-line system provided with my invention. Parts are shown in detail in position with a telephone-receiver hanging on its connecting and disconnecting lever or hook and the telephone in connection with the central station. Fig. 2 is a plan of the cut-out. Fig. 3 is a fragmental view which shows another instrument on the same circuit. The central station is also indicated in this view. The hand-phone or receiver is shown in the act of releasing the lever or hook to throw the drop at the central station, and the cut-out is shown in its operative position, cutting the telephone off of the circuit. Fig. 4 is a detail view of one of the instruments with its cut-out released ready to allow the telephone to be used. The position of the cut-out lever before it was released is indicated in dotted lines. The central station is also shown.

In the several views like characters indicate like parts, and the wires for the service-machine are shown in solid lines, and the wires which are solely for operating the cut-out are shown in broken lines.

A indicates the central station.

B indicates the battery for energizing the circuit.

C indicates the telephone or other service-machine, connected with the central station by a metallic service-circuit 1 2. In the views such circuit is broken to economize space.

D indicates in a general way an electrical cut-out on the service-circuit.

E indicates a magnet for operating the cut-out armature or lever.

3 4 indicate a metallic circuit connecting the magnet with the service-circuit through the cut-out.

F indicates a switch in the connection between the magnet and the cut-out.

5 indicates a supplemental conductor connected with one line of the service-circuit.

G indicates a key connected with the supplemental conductor and arranged to open and close the switch and to electrically connect the supplemental conductor with the magnet-wire at the instants only of respectively opening and closing the switch.

In the switch, $f$ indicates a spring permanently connected with the magnet-wire 3, and $f'$ indicates a contact-point permanently connected with the line 4.

$g$ indicates a spring for normally holding the key G away from the member $f$ of the switch. The lever H, which makes the connections in the telephone, is arranged to actuate the key G. In practical use the key G will be normally held by the telephone-receiver hook or lever H against the pressure of spring $g$ to hold the switch F open when the receiver I is on the hook. The key G is insulated from the lever H by insulation $g'$.

J indicates the armature or conducting-lever of the cut-out D, pivoted to vibrate between the contact-points 21 and 31 to separately contact with the same.

K indicates the post, to which the armature or lever J is pivoted and electrically connected, said post being electrically connected with the line 2 of the service-circuit and through such line with the supplemental conductor 5 and the key G.

L indicates a spring for normally holding the armature or lever J in contact with the contact-point 21 to close the cut-out to complete the line 2 of the service-circuit. The magnet E when energized acts in opposition to the spring L to cause the lever J to contact with contact-point 31 to open line 2 and to close line 3 of the magnet-circuit and cut off the service-machine C from the central station, as indicated in Fig. 3.

M indicates the drop in the central station.

N indicates a push-button at the central office, the same being means for opening and closing the service-circuit for all of the telephones of the particular system connected by such service-circuit. This button is placed at any convenient point for the operator.

In the several views, P indicates the telephone-transmitter; $p$, the conductors therefor; Q, the battery for the transmitter, and R the repeating-coil.

The practical operation of my invention is as follows: When the telephone is not in use, the hook or lever H is (as is common with telephone-hooks) normally depressed, thus holding the key G in position to open the switch F, so that the magnet is not energized, and the spring L is free to hold the armature in position to close the line 2 of the service-circuit, so that the telephone is in its normal condition and connected with the central station. When the receiver I is lifted from the hook and the hook rises, making the regular connections for the telephone, thereby bringing the telephone into condition ready for use, the key G being thus released rises under the impulse from the spring $g$ and allows the spring $f$ of the switch to engage the contact-point $f'$. This position of the parts is shown in Fig. 3 and is maintained for an instant only, for the reason that the further upward movement of the lever H allows the key G to separate from the spring $f$ of the switch F, as shown in Fig. 4. Referring again to Fig 3, it will be seen that at the instant the spring $f$ touches the contact-point $f'$ and before the key G has left the spring $f$ the electric circuit is completed between the sides 1 and 2 of the metallic circuit as follows: The current coming in on side 2 of the metallic circuit passes through the supplemental wire 5, then through the key G, spring $f$, contact-point $f'$, magnet-wire 4, then through the coil of cut-out magnet E to the magnet-wire 1 and side 1 of the circuit, thus energizing the magnet E and drawing the armature J down, as shown in solid lines in Fig. 3 and in dotted lines in Fig. 4, thereby disconnecting the armature J from point 21 and making a connection between the armature J and the point 31, thus allowing the current to flow from 2 of the line to the base K, then through the armature J, through the point 31, thence through the wire 3, through the contact-point $f'$, the spring $f$ of the switch, and then through the wire 4 and through the coils of the magnet E, then through magnet-wire 1 and the side 1 of the metallic circuit. The current thus passing through the magnet energizes the same and draws the armature down, thus completing the circuit through the armature and through the line 3 of the magnet-circuit, thus permanently energizing the magnet so long as the switch F is closed and the circuit is unbroken. When the lever H is lifted, thus throwing the parts of the telephone into operative position, the drop M is released in the central office in the ordinary manner, thus notifying the central office that the telephone is ready for use. If the operator desires to allow that particular instrument to be used, she will press the push-button N, so as to open the service-circuit for an instant, thus deënergizing the magnet and allowing the spring L to throw the armature J up to close the service-circuit, so that when the push-button N is released the telephone is then on the line ready for use. If while this telephone is in use the hand-phone or receiver is lifted from any or all of the other instruments on the line, the cutting-out operation which I have just described takes place at each instrument, so that all of said instruments in which the hook is raised instantly have their magnets energized and the service-circuit opened, so that none of such other instruments can operate without the consent of central.

In case one of the instruments on any party-line desires to speak with another instrument on the same party-line the central will connect the two instruments by pushing the push-button while the instruments to be connected are thrown into connection with the line by the hand-phone being off the hook. In this way any or all of the instruments of any party-line can be connected with each other.

The operator is to be required to refuse to connect any two on the same circuit or to connect the circuit with outside service-circuits until all of the hooks are down excepting the one or the two to have the service. After the instruments are thus connected it is impossible for any of the other parties of the line to cut in until the person who has been given the service hangs up his phone or until the operator at the central office shall release another phone by pressing the push-button, as above stated.

The cut-out magnet E should consist of two cores wound sufficiently high to avoid making the line dead in case several instruments are on at the same time.

What I claim, and desire to secure by Letters Patent of the United States, is—

1. A system for individual service on electrical party-lines comprising the combination with the central station and the service-machine connected therewith by a metallic service-circuit; of an electrical cut-out on said circuit; a magnet for operating the cut-out; a metallic circuit connecting the magnet with the service-circuit through the cut-out; a switch in the connection between the magnet and the cut-out; a supplemental conductor connected with one line of the service-circuit; a key connected with the supplemental conductor and arranged to open and close the switch and to electrically connect the supplemental conductor with the magnet-wire at the instants only of respectively opening and closing the switch; and independent means for opening and closing the service-circuit.

2. In an electrical system, the combination with a central station and a service-machine connected therewith by a metallic circuit, of an electrical cut-out on said circuit; a magnet for operating the cut-out; a metallic circuit connecting the magnet with the service-circuit through the cut-out; a switch in the connection between the magnet and the cut-out; a supplemental conductor connected with one line of the service-circuit; a key connected with the supplemental conductor and arranged to open and close the switch and to electrically connect the supplemental conductor with the magnet-wire at the instants only of respectively opening and closing the switch; the lever which makes the connections of the service-machine being arranged to close the switch when the connections in the service-machine are made; and independent means for opening and closing the service-circuit.

In testimony whereof I have signed my name to this specification, in the presence of two subscribing witnesses, at Los Angeles, California, this 18th day of September, 1899.

WM. TORST, JR.

Witnesses:
JAMES R. TOWNSEND,
WILLIAM P. MOONEY.